United States Patent [19]

Kosiorek et al.

[11] Patent Number: 4,649,062
[45] Date of Patent: Mar. 10, 1987

[54] ULTRAVIOLET RADIATION CURABLE VEHICLE FOR CERAMIC COLORS, COMPOSITION AND METHOD

[75] Inventors: Raymond S. Kosiorek, Houston, Pa.; Leslie R. Gatechair, Mt. Kisco, N.Y.

[73] Assignee: Ciba-Geigy Corporation, Ardsley, N.Y.

[21] Appl. No.: 727,184

[22] Filed: Apr. 25, 1985

Related U.S. Application Data

[63] Continuation of Ser. No. 455,685, Jan. 5, 1983, abandoned.

[51] Int. Cl.$^4$ .......................... C08F 2/50; B32B 27/16
[52] U.S. Cl. .................................... 427/54.1; 427/125; 427/228; 522/10; 522/14; 522/80; 522/81; 522/92; 522/95; 522/96; 522/101; 522/103; 522/107; 526/310; 526/320
[58] Field of Search .......................... 522/14, 10, 81; 427/54.1, 125, 228

[56] References Cited

U.S. PATENT DOCUMENTS

| | | | |
|---|---|---|---|
| 3,759,807 | 9/1973 | Osborn et al. | 204/159.15 |
| 4,070,262 | 1/1978 | Guarino et al. | 204/159.16 |
| 4,071,425 | 1/1978 | Guarino et al. | 204/159.16 |
| 4,072,592 | 2/1978 | Due et al. | 204/159.15 |
| 4,105,518 | 8/1978 | McGinniss | 204/159.18 |
| 4,131,529 | 12/1978 | Osterloh et al. | 204/159.19 |
| 4,306,012 | 12/1981 | Scheve | 430/308 |
| 4,318,791 | 3/1982 | Felder et al. | 204/159.23 |

*Primary Examiner*—John C. Bleutge
*Assistant Examiner*—A. H. Koeckert
*Attorney, Agent, or Firm*—Harry Falber

[57] ABSTRACT

Vehicles for ultraviolet radiation-curable ceramic enamels comprise (a) acrylate- or methacrylate-modified oligomers; (b) acrylate or methacrylate monomers, the functionality of (a) and (b) being selected to provide desired film and firing characteristics; (c) a combination of photoinitiators to provide a balance of surface and through cure; and an inhibitor to enhance shelf life. Printing media comprising pigmented frits and the vehicles are described, as are methods for their application to heat-resistant substrates, especially glass.

13 Claims, No Drawings

ULTRAVIOLET RADIATION CURABLE VEHICLE FOR CERAMIC COLORS, COMPOSITION AND METHOD

This application is a continuation of application Ser. No. 455,685 filed Jan. 5, 1983, now abandoned.

BACKGROUND OF THE INVENTION

This invention relates to ultraviolet radiation curable organic vehicles which are incorporated into compositions to provide thick film ceramic colors, which then can be cured almost instantly by ultraviolet radiation. Cured coatings of such compositions on heat resistant substrates, such as glass, metals and ceramics, can be fired at a later date, cleanly removing the organic portion and leaving a glassy pigmented ceramic enamel adhered firmly to the substrate.

Conventional coatings involving ceramic glass enamels or glazes use vehicles which are frequently oily in nature and require drying prior to application of a second color coat. Infrared heat is often used, but this is slow, costly, and energy consumption is very high. Conventional coatings also contain large percentages of solvents, which must be evaporated during the drying operation, but this is environmentally undesirable and leads to on-site safety hazards.

A more recent development is disclosed in Scheve, U.S. Pat. No. 4,306,012, incorporated herein by reference, in which a vehicle consisting of a solvent-free combination of conventional acrylate- or methacrylate-terminated prepolymers and acrylate- or methacrylate-monomers is stabilized by addition of free-radical polymerization inhibitors and mixed with a ceramic frit, then cured on a heat-resistant substrate by electron beam radiation or—after adding photoinitiators—by ultraviolet radiation. If, in practice, however, such compositions are applied by screen printing techniques, difficulty is encountered in printing because the viscosity of solvent-free media is difficult to adjust and the films tend to be too thin or to develop pin holes on firing. There are also observed difficulties, especially when using ultraviolet radiation, in curing the vehicle all the way through, if thick, highly pigmented films are laid down. Finally, without careful attention to selection of the components, difficulties are encountered in overprinting, that is, printing one layer and curing it, then printing another over it and curing it, and, finally, firing to produce a composite.

It has now been discovered that an improved ceramic vehicle can be provided, which is amenable to use in a very low solvent containing screen printable composition with ceramic frits. The vehicle employs a balance in terms of cross-link density of an acrylate- or methacrylate-terminated oligomer component, a balance in terms of functionality of an acrylate- or methacrylate-terminated monomer component, a balanced combination in terms of depth of cure of photoinitiators, and an inhibitor against polymerization while the vehicle is stored in the dark. In preferred embodiments, the new vehicles of this invention will also include flow promoters. Also provided are printable compositions comprising the new vehicles, a conventional amount of a ceramic frit (pigment), and a small, effective amount of a solvent to provide screen printability. In addition, methods are provided to print heat-resistant substrates with compositions containing the new vehicle. With the present invention, very high cure speeds are possible, up to 100 ft./min., with some colors, and this permits reduced energy costs, improved handling, and stacking. Highly pigmented coatings approaching two mils wet film thickness can be used, because of the excellent depth of cure provided by the photoinitator combination employed herein. In contrast with conventional vehicles, controlled burnout of the vehicles of this invention more readily provides pinhole-free coatings after firing. In addition, the present compositions can be used with different colors, such as blacks and whites, without modification of the photoinitiator or base vehicle, and they also lend themselves to multiple-color applications.

SUMMARY OF THE INVENTION

According to the present invention, in its broadest aspect, there are provided ultraviolet radiation curable vehicles for ceramic frits, the vehicles comprising:

(a) at least one polymerizable liquid oligomer containing a backbone including at least two acrylate or methacrylate functional end groups; the minimum functionality of said oligomer component (a) being at least sufficient to provide adequate cure and solvent resistance to the cured vehicle and the backbone being selected to provide adequate adhesion of the cured vehicle to a substrate;

(b) at least one photopolymerizable liquid monomer containing acrylate or methacrylate functional groups, the functionality of said monomer component (b) being in the range of from 1 to 6;

(c) an effective amount of a photoinitiator combination comprising
  (i) an acetophenone derivative; and at least one of
  (ii) a substituted thioxanthone compound;
  (iii) an amine compound or
  (iv) a mixture of (ii) and (iii), the ratios of (i), (ii) and (iii) being selected to provide a balance of surface cure and through cure on ultraviolet exposure of films comprising said vehicle; and (d) an amount of a polymerization inhibitor which is at least effective to retard polymerization of the vehicle in total darkness, but less than an amount which will significantly retard the rate of cure of said vehicle when exposed to ultraviolet light.

In accordance with an especially preferred feature of the present invention, there are provided ultraviolet radiation curable vehicles for ceramic frits, the vehicles comprising (a) not less than three polymerizable liquid oligomers, each containing acrylate or methacrylate functional end groups and selected from
(i) a difunctional- or trifunctional-polyester acrylate or methacrylate, a difunctional- or trifunctional-polyether acrylate or methacrylate, a difunctional- or trifunctional-polyester-polyether acrylate or methacrylate, a difunctional- or trifunctional-polyurethane acrylate or methacrylate or a mixture any of the foregoing;
(ii) an at least tetrafunctional polyester-polyether acrylate or methacrylate; and
(iii) an epoxidized unsaturated fatty acid triglyceride acrylate or methacrylate; the amount of (ii) being at least sufficient to increase solvent resistance of the cured vehicle and the amount of (iii) being at least sufficient to enhance the adhesion thereof to a substrate;

(b) not less than three polymerizable liquid monomers, each containing acrylic or methacrylic functional groups and selected from
(i) a monofunctional polyether acrylate or methacrylate;
(ii) at least one difunctional polyglycol acrylate or methacrylate; and
(iii) at least one trifunctiohal aliphatic triacrylate or trimethacrylate; the ratios of (i), (ii) and (iii) being selected to provide an acrylate or methacrylate functionality of not less than 1 nor more than 3;
(c) an effective amount of a photoinitiator combination comprising
(i) a 2-phenyl acetophenone compound;
(ii) a substituted thioxanthone compound; and
(iii) an ester of an aminobenzoic acid, or a tertiary amine, the ratios of (i), (ii) and (iii) being selected to provide a balance of surface cure and through cure on ultraviolet exposure of films comprising said vehicle; and
(d) an amount of a polymerization inhibitor which is at least effective to retard polymerization of the vehicle in total darkness, but less than an amount which will significantly retard the rate of cure of said vehicle when exposed to ultraviolet light.

Also provided by the present invention are ultraviolet radiation curable compositions for coating the surface of the heat-resistant substrates. Such compositions comprise
(1) 100 parts by weight of a vehicle as defined above; and
(2) from about 200 parts to about 550 parts by weight of a ceramic frit.

Screen printability will be best if the vehicle also includes
(e) a flow promoter, and if the coating composition also includes
(3) a small amount of a solvent for the vehicle, both of which will be described hereinafter.

The present invention also includes within its features a process for coating a heat-resistant substrate selected from glass, metal and ceramic comprising
(1) applying a printing medium to the heat-resistant substrate, wherein the printing medium comprises a ceramic frit and a vehicle therefor, as defined above;
(2) curing the medium with ultraviolet radiation after it is applied to the substrate; and
(3) thereafter firing the substrate with the applied and cured printing medium at a temperature sufficient to burn off the vehicle and fuse the frit to the substrate.

Among the features of the invention are the use of such a process in overprinting two or more media which can be of different colors, some of which can contain conventional vehicles and one or more of which can be electrically conductive, and the like.

DETAILED DESCRIPTION OF THE INVENTION

The vehicle of this invention is composed of (a) one or more prepolymers which exhibit desired film and firing characteristics; (b) one or more monomers which impart desired rheological properties, reduce viscosity and provide desirable functionality; (c) a combination of photoinitiators which provide a balance of surface cure and through cure in ultraviolet radiation treated films formed from the vehicle, and a polymerization inhibitor, or stabilizer, which retards the cross-linking reaction in total darkness by consuming some of the free radicals present. All of the individual components can be readily made by those skilled in this art, and all of them are readily available from at least one commercial source, as will be mentioned hereinafter.

With respect to oligomer component (a), all of the required features can be provided with the selection of a single entity, if a judicious choice is made. Preferably, however, a combination of oligomers will facilitate balancing of properties, such as adhesion, clean burnout on firing, etc., as will be discussed later. In any event, if a single oligomer is used, typical materials will generally comprise, for example, urethane acrylates with aromatic or aliphatic backbones, with functionality ranging from 2 to 6, preferably about 3, a molecular weight in the range of 100 to over 2500, preferably from 1000 to 2500, a viscosity in the range of 20 poise to above 200 poise, preferably above 200 poise. A suitable commercially available material is EBECRYL 264, produced by Virginia Chemicals Inc., Portsmouth, Va., U.S.A.

Preferably, however, the liquid oligomers will comprise a combination: As component (a)(i) a difunctional- or trifunctional-polyester acrylate or methacrylate terminated polyester-, polyether-, polyester polyether- or polyurethane-backbone low polymer, e.g., a terminally unsaturated polyester polyether block copolymer as described by Ibata, et al., U.S. Pat. No. 3,960,572; or a terminally unsaturated polyurethane as described by Finelli, et al., in U.S. Pat. No. 4,057,431, or a terminally unsaturated polyester, polyether, or polyesterpolyether as described in the above-mentioned Scheve patent, U.S. Pat. No. 4,306,012, can be used. In general, such materials will have a number average molecular weight in the range of about 15,000 to about 80,000, but this is not critical. Useful results have been obtained with acrylate functionality in the range of two to three, and the backbone polymer can be aliphatic or aromatic. In preferred embodiments, component (a)(ii) is used to increase the functionality of the oligomer combination. It may comprise an oligomer with at least four terminally unsaturated acrylate or methacrylate groups. Increased functionality appears to have a beneficial effect in overprinting due to increased cross-link density. Typically useful for this purpose are tetrafunctional polyether-polyester acrylates and hexafunctional polyether-polyester acrylates, such as those made by the procedures of the above-mentioned patents, and those available from Diamond Shamrock Company under product designation PHOTOMER 5018 and 5007. Such products typically are aliphatic in nature, clear, and liquid in form. In preferred embodiments, component (a)(iii) may be an oligomer primarily selected to improve the adhesion of coatings containing the vehicle to glass or other difficult substrates. This, in general, will have a functionality of at least 3 and, illustratively, will comprise an acrylate- or methacrylate-modified epoxidized vegetable oil, such as an unsaturated fatty acid triglyceride, e.g., oleic acid triglyceride, linoleic acid triglyceride, linseed oil, and the like. These can be made by known procedures. Preferred for use is an acrylate-modified epoxy linseed oil, which is characterized as a viscous oligomer, clear and amber with a saponification number of 260–280, an acid value of 3 mg. KOH/gm. max., and a viscosity of 150,000–175,000 cps at 25° C. A suitable material is also available from Diamond Shamrock Corporation, Morristown, N.J., U.S.A., under product designation PHOTOMER 3082. While preferred contents of the oligomer components in the combination will be set forth later, it is essentially necessary only to use an amount of (a)(ii) at least sufficient to increase solvent resistance of the cured vehicle, and an amount of (a)(iii) sufficient to enhance adhesion of the vehicle ultimately to the substrate.

As with oligomer component (a), only one monomer (b) can be employed in the composition, but it is easier to balance properties by using a combination of monomers.

Such a combination of monomers will comprise as component (b)(i) a monofunctional polyether acrylate or methacrylate and enough of (b)(ii) and (b)(iii), di- and tri-functional monomers to reduce viscosity of the vehicle and enhance functionality so that printability with high loadings of ceramic frits is facilitated. Among the monomers which can be selected for this use are allyl acrylate, allyl methacrylate, tetrahydrofuryl acrylate or methacrylate, diallyl fumarate, triethylene glycol dimethacrylate, ethylene glycol dimethacrylate, cyclohexyl methacrylate, tetraethylene glycol dimethacrylate, polyethylene glycol dimethacrylate, n-hexyl methacrylate, 1,3-butylene glycol diacrylate, 1,4-butanediol diacrylate, diethylene glycol diacrylate, diethylene glycol dimethacrylate, 1,6-hexanediol diacrylate, 1,6-hexanediol dimethacrylate, neopentyl glycol diacrylate, 2-(2-ethoxy-ethoxy) ethyl acrylate, polyethylene glycol 200 diacrylate, tetraethylene glycol diacrylate, tetrahydrofurfuryl acrylate, pentaerythritol polyacrylate, 1,3-butylene glycol dimethacrylate, tripropylene glycol diacrylate, n-lauryl acrylate or methacrylate, 2-phenoxyethyl acrylate, trimethylol propane trimethacrylate, trimethylolpropane triacrylate, glicydyl methacrylate, glycidyl acrylate, acrylated methylolmelamine, and the like. Preferred for component (b)(i) is a monofunctional polyether acrylate, especially ethoxyethoxyethyl acrylate. This is commercially available, e.g., from Thiokol Corp., Trenton, N.J., U.S.A., Product RC-20, and from Sartomer Co., West Chester, Pa., U.S.A., Product SR-256. Preferred for component (b)(ii) is one or more of a polyethylene glycol diacrylate, such as one from the above list, or a commercial polyethylene glycol diacrylate, such as the clear, pale yellow liquid of 18–25 cps viscosity at 25° C. produced by Diamond Shamrock, PHOTOMER 4050; and tripropylene glycol diacrylate, such as the clear, pale yellow liquid of 13–20 cps viscosity, produced by Diamond Shamrock, PHOTOMER 4061. Preferred for component (b)(iii) are one or more of the trifunctional aliphatic triacrylates or trimethacrylates mentioned by chemical name above. These can be prepared by those skilled in this art, or commercial sources can be used, such as Diamond Shamrock, PHOTOMER 4149 and PHOTOMER 4072. The average functionality of component combination (b) is typically in the range of 1 and 3 and preferably in the range of about 2 to 3. This can best be achieved by adjusting the contents of (b)(i) and (b)(iii) to provide equal amounts of each.

The combination of photoinitiators will comprise as components (c)(i) an acetophenone derivative, e.g., 2,2-diethoxyacetophenone, 2,2-dimethoxy-2-phenylacetophenone, halogenated alkyl aryl ketones, α-hydroxy-α-cyclohexyl phenyl ketone, benzoin alkyl ethers, and the like. Preferred is 2,2-dimethoxy-2-phenyl-acetophenone, commercially available from CIBA-GEIGY Corp., Ardsley, N.Y., U.S.A., IRGACURE 651. Helpful for deep curing are (c)(ii) substituted thioxanthone compounds, among which can be mentioned 2-chlorothioxanthone, 2-isopropylthioxanthone (Quantacure ITX) 2-methylthioxanthone 2-decylthioxanthone and 2-dodecylthioxanthone (DTX). These can be made in known ways and also are available from commercial sources. Preferred is isopropylthioxanthone, Aceto Chemicals Co., Flushing, N.Y., U.S.A., Quantacure ITX. Important for a proper balance of surface and through curing properties is component (c)(iii) which broadly is an amine compound such as an ester of an amino benzoic acid, or a tertiary amine, and, illustratively, an alkyl ester such as ethyl (2-dimethylamino) benzoate and ethyl(4-dimethylamino) benzoate, Aceto Chemical Co. Quantacure EOB and EPD, respectively, the latter being preferred, and dimethylethanolamine. See, Osborne, U.S. Pat. No. 3,759,807. Also suitable is the Michel addition product of one mole of a secondary amine, such as dimethylamine and a mole of a multifunctional acrylate. See, e.g., U.S. Pat. Nos. 3,844,916, 3,925,349; and 3,914,165.

With respect to the acetophenones, more generally, they may be one or more of a compound of the formula

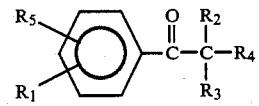

wherein, independently, $R_1$ and $R_5$ are halogen, hydrogen, alkyl, alkoxy, alkylthioether, alkyl carboxylate, alkyl sulfonate or a carboxylate or sulfonate salt with a cation of sodium, lithium, potassium or a Group II metal, $R_2$ and $R_3$ are alkyl, e.g., 0–6 methylene plus $CH_3$, or taken together, may form a ring, e.g., $-C_4H_8-$, $-C_5H_{10}-$, or $-C_2H_4O-C_2H_4-$, $R_4$ s aryl or substituted aryl, alkyl, hydroxyl, the group $-OR$, wherein R is alkyl, the group $-O-Si(CH_3)_3$, or the group

wherein $R_2$ and $R_3$ are as defined above. Amine modified such compounds are disclosed in U.S. Pat. Nos. 4,048,034 and 4,318,791.

Acetophenone phosphones can also be used. These have the general formula

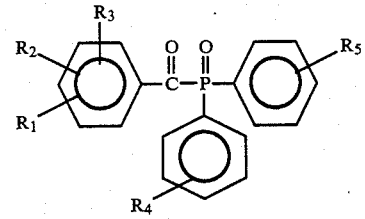

wherein $R_1$ and $R_2$, independently, are hydrogen or lower ($C_1-C_6$) alkyl and $R_3$, $R_4$ and $R_5$ are hydrogen, alkyl or aryl. Preferably, each of $R_1$ and $R_2$ are methyl and located ortho to the carbonyl group. Such compounds are disclosed in U.S. Pat. No. 4,265,723.

Inhibitor component (d) can comprise a substituted phenol, or a quinone, a phenothiazine, nitrobenzene, or the like. Preferably a phenolic type inhibitor will be used, such as hydroquinone, methylhydroquinone, and the like, with hydroquinone being preferred. This is available commercially. The amounts to be used can vary, e.g., from about 0.01 to about 0.5 parts per hundred of vehicle. It is preferred to use not in excess of an amount which will seriously retard the ultraviolet curing time, and this is usually less than about 0.05 parts per hundred, same basis.

In a preferred feature, a flow promoting agent (e) will be included. This will generally comprise a polymeric material which acts to improve screenability in a screen printing process. It will be compatible with the other components in the vehicle, and will burn off with them in a clean manner. Among the promoters previously used but not preferred are silicone polymers. Much to be preferred are polymerized olefin hydrocarbons, especially polybutene hydrocarbons. A suitable commercial product is a viscous polybutene polymer available from Amoco Chemicals, Chicago, Ill., U.S.A., as IN-DOPOL L-14. Only small amounts need be used, e.g., between about 0.2 and 2.0 parts per 100 parts by weight of vehicle, and preferably between 0.5 and 1.0 parts by weight, same basis.

As has been disclosed above, the contents of components in the vehicle can vary over rather wide ranges. The preferred ranges will, however, usually comprise:

(a) from about 45 to about 65 parts by weight of the oligomer component;

(b) from about 30 to about 40 parts by weight of the monomer component;

(c) from about 5 to about 15 parts by weight of the photoinitiator component;

(d) from about 0.01 to about 0.5 parts by weight of the inhibitor component; and (e) from about 0 to about 2.0 parts of any flow promoter component, all based on 100 parts by weight combined of components (a) to (e) inclusive.

With respect to formulating the surface coating compositions of this invention, conventional components are generally used with the new vehicles described above. The compositions are made by intimately admixing the vehicle with from about 2 to about 5.5 parts and more usually 2.5 to 4.0 parts by weight of a ceramic frit for each 1 part by weight of the vehicle. Ceramic frits are known commercial products consisting of high temperature stable inorganic compounds in specially designed glasses. In general, the frits are irregular shaped particles having diameters of about 40 to about 75 microns. Illustrative of the inorganic compounds are ferric oxide, titanium dioxide, chromium oxid, zinc oxide, magnesium dioxide, alumina, cobalt oxide, and cadmium oxide. Silicates such as praseodymium and zirconium silicate are also useful.

In accordance with conventional techniques, see for example, U.S. Pat. No. 4,306,012, above-mentioned, the coating compositions are applied to glass, metal or ceramic substrates, preferably by forcing the composition onto a workpiece through a screen. The composition will form a film which will not run at room temperature, but it will rub off. To prevent this, the vehicle is subjected to ultraviolet radiation and the vehicle cures or hardens. Suitable for this purpose is a radiation intensity of about 0.1–100 watts per square centimeters. After such exposure, the coating will have been cured to such an extent that, ideally, a twisted thumbprint cannot be impressed into it. After curing, the substrate coated with the cured composition is fired in the region of 1000°–1400° F., depending on the nature of the substrate. Ideally, the vehicle is initially entirely burned off around 950°–1100° F. Then at the corresponding temperature for the proper frit, the frit and pigment are fused to the surface of the substrate and become a permanent part thereof. Clean burnoff is accomplished by the vehicles of this invention because they are not so tightly crosslinked that they are still present when the frit is melting, permitting ash to be trapped under the surface and giving the coating an undesirable irregular surface.

In using the novel vehicles of this invention in printing media, it is a preferred feature of the invention to include with the vehicle and the frit/pigment a small, but effective to enhance screen printability amount of a solvent for the vehicle component of the composition. This is almost essential to reduce the viscosity to a point at which the tiny holes in the screen will pass enough composition to build a sufficiently thick film. Pinholes in the ultimately produced fired coating will also be minimized, too. Among the solvents which can be used are butyl alcohol, methyl isobutyl carbitol and aromatic hydrocarbons. The desired reduction in viscosity is the production of a thin, well flowing composition with only a small amount, e.g., 0.4 cc. of solvent per 10 g. of paste. Solvents which are not preferred will reduce the viscosity to a buttery consistency, and solvents which are ineffective will actually thicken the paste, e.g., carbitol acetate, and butyl carbitol. Especially preferred solvents are liquid aromatic hydrocarbons, and mixtures, thereof, e.g., those in which the major components are $C_9$-$C_{10}$ aromatics. It will facilitate uniform curing if the solvent in a preferred embodiment includes a content of photoinitiator combination (c)(i), (c)(ii), and (c)(iii) sufficient to maintain the concentration of the photoinitiator constant with respect to the oligomers (a) and the monomers (b). Preferred commercial solvents are Exxon Company's Products, Solvesso 100 and Solvesso 150.

DESCRIPTION OF THE PREFERRED EMBODIMENTS

This invention is illustrated by the following examples, in which all parts are by weight unless otherwise noted.

EXAMPLE 1

A vehicle is prepared by mixing three oligomers comprising 19.6 parts of a clear, yellow-orange viscous liquid acrylate terminated copolymer containing polyester linkages in its backbone (Thiokol Product ZL-1178), specific gravity 1.1 g./cc.; 8.8 parts of a tetrafunctional polyether/polyester acrylate (Diamond Shamrock PHOTOMER 5018), and 5.4 parts of an acrylate-modified epoxy linseed oil (Diamond Shamrock PHOTOMER 3082). Included in the mixture are five monomers comprising 2.7 parts of a polyethylene glycol diacrylate (Diamond Shamrock PHOTOMER 4050); 5.4 parts of an aliphatic triacrylate (Diamond Shamrock PHOTOMER 4072); 5.4 parts of trioroovlene glycol diacrylate; 5.4 parts of a second aliphatic triacrylate (Diamond Shamrock, PHOTOMER 4149); and 5.4 parts of ethoxyethoxyethyl acrylate. Three photoinitiators are also included comprising 4 parts of 2,2-dimethoxy-2-phenylacetophenone; 1 part of ethyl 4-dimethylaminobenzoate; and 2 parts of 2-isopropylthioxanthone. As flow promoter there is added 0.45 parts of a polybutene liquid resin (AMOCO Product L-14). Finally there is included 0.03 parts of hydroquinone as an inhibitor. The vehicle is pale yellow, clear and has the consistency of light honey.

EXAMPLE 2

The procedure of Example 1 was exactly repeated, except that the amount of hydroquinone inhibitor was increased to 0.06 parts. A vehicle according to this invention was obtained.

EXAMPLE 3

The procedure of Example 1 was exactly repeated, except that the amount of hydroquinone inhibitor was increased to 0.12 parts. A vehicle according to this invention was obtained.

EXAMPLES 4-5 (COMPARATIVE EXAMPLES A-D)

The procedure of Example 1 was exactly repeated, but the inhibitor was omitted, and in 3 out of 4 instances, the ratios of ingredients in the photoinitiator combination was varied, according to the following Table:

| COMPARATIVE EXAMPLE | A | B | C | D | E |
|---|---|---|---|---|---|
| Base | (as in Example 1) | | | | |
| 2,2-dimethoxy-2-phenyl acetophenone | 4 | 4 | 3.6 | 3.2 | 3.6 |
| ethyl 4-dimethylaminobenzoate | 1 | 0.5 | 0.9 | 0.9 | 0.45 |
| 2-isopropylthioxanthone | 2 | 2 | 1.8 | 1.6 | 1.8 |
| hydroquinone | — | — | — | — | — |

These vehicles, as will be shown, were not suitable for use in this invention.

EXAMPLES 6-8

To 32 parts of each of the vehicles of Examples 1-3, inclusive, and Comparative Examples A-D, inclusive, was added ½ parts of black ceramic frit (a 3.5 to 1 ratio of frit to vehicle). The mixture was milled until uniform on a 3-roll mill to produce stabilized compositions suitable for use as print media according to this invention (Examples 6-8), and unstabilized compositions for comparison purposes (Comparative Examples E-I). To demonstrate stability under accelerated aging conditions, each of the print media was placed in a 2 oz. by volume plastic container and placed in an oven at 140° F. The specimens were removed at 24 hour intervals and examined for evidence of solid formation, which, when it occured, usually began by thickening and formation of a small ball in the center of the mass. The results are set forth in the following Table:

| EXAMPLE | 6 | 7 | 8 | E* | F* | G* | H* | I* |
|---|---|---|---|---|---|---|---|---|
| Stabilizer (pbw) | | | | | | | | |
| hydroquinone | 0.03 | 0.06 | 0.12 | — | — | — | — | — |
| Stabilizer, weight % | 0.048 | 0.097 | 0.193 | — | — | — | — | — |
| Observation, Oven Aged, 140° F. | | | | | | | | |
| 24 hrs. | ok** | ok | ok | ok | ok | solid | ok | ok |
| 48 hrs. | ok | ok | ok | solid | solid | — | solid | small ball |
| 72 hrs. | ok | ok | ok | — | — | — | — | — |
| 96 hrs. | ok | ok | ok | — | — | — | — | — |
| 120 hrs. | ok | ok | ok | — | — | — | — | — |
| 144 hrs. | ok | ok | ok | — | — | — | — | — |
| 168 hrs. | ok | ok | ok | — | — | — | — | — |

*Comparative Example
**ok - maintained useful viscosity.

The results in the table demonstrated the need to use a stabilizer to prevent premature curing at elevated temperatures and to ensure adequate storage stability at ordinary temperatures. The results with the unstabilized compositions demonstrate that without any stabilizer, no substantial resistance to solidification under elevated temperature conditions can be secured by the obvious expedient of reducing the photoinitiator content, unless it is substantially reduced, e.g., 10 percent less total photoinitiator combined with a 50 percent reduction in ethyl 4-dimethylaminobenzoate (EPD) content.

EXAMPLE 9

If 3710 parts of a black standard automotive windshield color frit and pigment powder is mixed in a bakery type mixer with 928 parts by weight of a vehicle prepared as described in Example 1 and the mixture is milled on a 4"×8" laboratory three roll mill, one time, there will be obtained a storage stable composition for printing on a heat resistant substrate according to this invention. If the material is applied through a 310 mesh print screen in a 3"×3" square about 1.5 mils thick onto a glass plate, and if the coated plate is passed under 2 mercury lamps operating at 300 watts/inch in a Fusion Systems ultraviolet radiation machine at a rate of 40 feet/minute, then a cured coating, resistant to tearing under pressure of a twisted thumb will be obtained. If the coated plate is next placed in an oven and subjected to a temperature of 1350° F. for 3 minutes, the organic vehicle will burn off completely and the coating will have a smooth glossy surface with the ceramic frit fused tightly to the substrate.

EXAMPLES 10-11

If the procedure of Example 9 is exactly repeated substituting the vehicles of Example 2 and 3, then substrates adequately coated by the procedures of this invention will be obtained.

EXAMPLE 12

If to 900 grams of a black-pigmented paste prepared according to the first part of Example 9 there is added 6 cc of dimethylethanolamine and 36 cc of an aromatic hydrocarbon solvent (Solvesso 100, 84.5% C$_9$ aromatics), there will be obtained a medium in which the solvent enhances screen printability. If the composition is printed on a glass plate as described in Example 9 and cured under 2 mercury lamps at a belt speed of 10 ft., 20 ft., 40 ft. and 100 ft./min, a coating will be obtained which resists the pressure of a twisting thumb. If the coated substrate is then fired at 1250° F. for 3 minutes, an excellent fused coating, with complete vehicle burnout, will be produced on the glass plate.

EXAMPLES 13 and 14

If white-pigmented pastes are prepared by mixing 3.5 and 4.0 parts by weight of a white frit and pigment with 1 part of a vehicle as prepared in Example 1 and if 10 parts of the pastes are added 0.4 parts by volume of aromatic hydrocarbon solvent, there will be obtained screen printable media according to this invention. If a 3"×3" film is screen printed on a 4"×4" glass plate with the respective compositions and if the coating is exposed to two mercury lamps at a machine speed of 40 ft./min, a cured coating resistant to marring under the pressure of a twisted thumb will be obtained. If the coated substrate is fired out at 1350° F. for 3 minutes a white coating, completely free of vehicle, will be obtained. This is especially difficult to achieve with prior art vehicles without the need for modification.

EXAMPLE 15

If two printing media, one black pigmented and one white pigmented are prepared according to the procedures of the above Examples 9 and 13, and if the black medium is screen printed on glass first and cured with two mercury lamps at 40 ft./min., and then overprinted with the white medium and cured again, and if the overprinted and subsurface coatings are fired at 1300° F. for 3 minutes, a perfectly fired coating will be obtained. The frit used in the subsurface coating should be selected to provide a firing temperature of about 20° F. higher than that of the overcoated enamel.

EXAMPLE 16

If two printing media, one a conventional screen printable conductive composition comprising a low melting glass frit, e.g., a lead borosilicate, and a conductive amount of a metal powder, e.g., silver powder or silver flake, dispersed in a pine oil based resinous vehicle and a black pigmented medium as described in the procedure of Example 9 are provided, and if the conductive medium is screen printed on glass first and heat cured, and the black medium is screen printed over the first and cured with two mercury lamps, and if the subsurface and the overprinted coatings are fired at 1250° to 1350° F. for 2.5 to 5 minutes, a perfectly fired coating will be obtained, the subsurface layer being electrically conductive.

EXAMPLE 17

A vehicle is prepared by mixing 3 oligomers described in Example 1 by Company source and physical properties comprising 26 parts of the acrylate copolymer (ZL-1178), 12 parts of the tetrafunctional polyether/polyester acrylate (PHOTOMER 5018), and 8 parts of the acrylate-modified epoxy linseed oil (PHOTOMER 3082). Included in the mixture are five monomers described in Example 1 by Company source and physical properties comprising 4 parts of a polyethylene glycol diacrylate (PHOTOMER 4050), 8 parts of an aliphatic triacrylate (PHOTOMER 4072), 8 parts of tripropylene glycol diacrylate (PHOTOMER 4061), 4 parts of an aliphatic triacrylate (PHOTOMER 4149), and 6 parts by weight of ethoxyethoxyethyl acrylate. Five photoinitiators are also included comprising 1.1 parts of 2,2-dimethoxy-2-phenylacetophenone, 0.36 parts of 2-hydroxy-2-methyl-1-phenylpropane-1-one, 0.36 parts of 2(n-butoxy)ethyl 4-dimethylaminobenzoate, and 0.36 parts of 2-(dimethylamino) ethyl benzoate. If to the resulting mixture 0.03 parts of hydroquinone is added, a stabilized vehicle according to this invention will be obtained.

EXAMPLE 18

If 511 parts of the vehicle of Example 17 is milled with 1866 parts of black ceramic frit and 5 parts of fumed colloidal silica and if there is added 92 parts of aromatic hydrocarbon solvent (SOLVESSO SC100) and 22 parts of dimethylethanolamine, a screen printable medium according to this invention will be obtained which, on glass, will, after ultraviolet irradiation, fire out well at conventional temperatures to produce a smooth, glossy, pinhole free coating, firmly adhered to the substrate.

The above-mentioned patents are incorporated herein by reference. Many variations will suggest themselves to those skilled in this art in light of the above, detailed description. For example, instead of hydroquinone, there can be substituted methyl hydroquinone and phenothiazine. Instead of the oligomer comprising polyester units in the backbone, oligomers containing urethanes, polyethers, copolymers of polyesters and polyethers, and the like in the backbone can be used. Small amounts of the respective photoinitiators can also be included in the solvent, if added to enhance printability, to maintain photoinitiator content constant, and to minimize any tendency to retard cure rate under ultraviolet radiation exposure. Firing can be effectuated at 1350° F. in 2.5 minutes. All such modifications are within the full intended scope of the appended claims.

We claim:

1. An ultraviolet radiation curable vehicle for ceramic frits, said vehicle comprising
   (a) not less than three polymerizable liquid oligomers, each containing acrylate or methacrylate functional end groups and selected from
      (i) a difunctional- or trifunctional-polyester acrylate or methacrylate, a difunctional- or trifunctional-polyether acrylate or methacrylate, a difunctional- or trifunctional-polyester-polyether acrylate or methacrylate, a difunctional- or trifunctional-polyurethane acrylate or methacrylate or a mixture of any of the foregoing;
      (ii) an at least tetrafunctional polyester-polyether acrylate or methacrylate; and
      (iii) an epoxidized unsaturated fatty acid triglyceride acrylate or methacrylate; the amount of (ii) being at least sufficient to increase solvent resistance of the cured vehicle and the amount of (iii) being at least sufficient to enhance the adhesion thereof to a substrate;
   (b) not less than three polymerizable liquid monomers, each containing acrylic or methacrylic functional groups and selected from
      (i) a monofunctional polyether acrylate or methacrylate;
      (ii) at least one difunctional polyglycol acrylate or methacrylate; and
      (iii) at least one trifunctional aliphatic triacrylate or trimethacrylate; the ratios of (i), (ii) and (iii) being selected to provide an acrylate or methacrylate functionality of not less than 1 nor more than 3;
   (c) an effective amount of a photoinitiator combination comprising
      (i) a 2-phenyl acetophenone compound;
      (ii) a substituted thioxanthone compound; and
      (iii) an ester of an aminobenzoic acid, or a tertiary amine, the ratios of (i), (ii) and (iii) being selected to provide a balance of surface cure and through cure on ultraviolet exposure of films comprising said vehicle; and
   (d) an amount of a polymerization inhibitor which is at least effective to retard polymerization of the vehicle in total darkness, but less than an amount which will significantly retard the rate of cure of said vehicle when exposed to ultraviolet light.

2. An ultraviolet radiation curable vehicle, as defined in claim 1, wherein the inhibitor component (d) comprises hydroquinone.

3. An ultraviolet radiation curable vehicle, as defined in claim 1, which also includes (e) a small, effective amount of flow promoter.

4. An ultraviolet radiation curable vehicle, as defined in claim 3, wherein the flow promoter (e) comprises a polymerized butene hydrocarbon.

5. An ultraviolet radiation curable composition for coating the surface of a heat-resistant substrate comprising
   (1) 100 parts by weight of a vehicle as defined in claim 1, and
   (2) from about 200 parts to about 550 parts by weight of a ceramic frit.

6. An ultraviolet radiation curable composition, as defined in claim 5, which also includes
   (3) a small, but effective to enhance screen printability, amount of a solvent for the vehicle component of said composition.

7. An ultraviolet radiation curable composition, as defined in claim 6, wherein said solvent (3) comprises a liquid aromatic hydrocarbon mixture in which the major components are $C_9$-$C_{10}$ aromatics.

8. An ultraviolet radiation curable vehicle, as defined in claim 3, which comprises
   (a) 45 to 65 parts by weight of said oligomeric component;
   (b) 30 to 40 parts by weight of said monomer component;
   (c) 5 to 15 parts by weight of said photoinitiator component;
   (d) 0.01 to 0.5 parts by weight of said inhibitor component; and
   (e) to 0.2 to 2.0 parts by weight of said flow promoter component per 100 parts by weight of components (a) to (e), inclusive.

9. An ultraviolet radiation curable vehicle, as defined in claim 1, wherein component
   (a)(i) comprises a difunctional- or trifunctional-acrylate containing polyester backbone units;
   (a)(ii) comprises a tetrafunctional polyester-polyether acrylate;
   (a)(iii) comprises an acrylated epoxylated linseed oil;
   (b)(i) comprises ethoxyethoxyethyl acrylate;
   (b)(ii) comprises a polyethyleneglycol diacrylate and tripropylene glycol diacrylate;
   (b)(iii) comprises at least one aliphatic triacrylate;
   (c)(i) comprises 2,2-dimethoxy-2-phenylacetophenone;
   (c)(ii) comprises 2-isopropylthioxanthone;
   (c)(iii) comprises ethyl 4-dimethylaminobenzoate; and
   (d) comprises hydroquinone.

10. An ultraviolet radiation curable vehicle, as defined in claim 8, where flow promoter component (e) comprises a polybutene.

11. A process for coating a heat-resistant substrate selected from glass, metal and ceramic comprising
    (1) applying a printing medium to the heat-resistant substrate, wherein the printing medium comprises a ceramic frit and a vehicle therefor, as defined in claim 5;
    (2) curing the printing medium with ultraviolet radiation after it is applied to the substrate; and
    (3) thereafter firing the substrate with the applied and cured printing medium at a temperature sufficient to burn off the vehicle and fuse the frit to the substrate.

12. A process for coating a heat-resistant substrate selected from glass, metal and ceramic comprising
    (1) applying a solvent-containing printing medium to the heat-resistant substrate, wherein the printing medium comprises a ceramic frit and a vehicle therefor and a solvent, as defined in claim 6;
    (2) curing the printing medium with ultraviolet radiation after it is applied to the substrate; and
    (3) thereafter firing the substrate with the applied and cured printing medium at a temperature sufficient to burn off the vehicle and fuse the frit to the substrate.

13. A process for coating a heat-resistant substrate selected from glass, metal and ceramic comprising
    (1A) applying a first printing medium to the heat-resistant substrate, wherein the printing medium comprises a low-melting ceramic frit, a conductive metal powder and a resinous vehicle and allowing the medium to cure in place;
    (1B) applying a second printing medium to the heat-resistant substrate over the first printing medium, wherein the second printing medium comprises a ceramic frit and a vehicle therefor, as defined in claim 5;
    (2) curing the second printing medium with ultraviolet radiation after it is applied to the substrate; and
    (3) thereafter firing the substrate with the applied and cured printing media at a temperature sufficient to burn off the vehicles and fuse the frits to the substrate so as to provide an overprinted electrically conductive subsurface layer.

* * * * *